United States Patent
Chang et al.

(10) Patent No.: US 11,932,207 B1
(45) Date of Patent: Mar. 19, 2024

(54) UNIVERSAL WIPER BASE ASSEMBLY STRUCTURE

(71) Applicant: DANYANG UPC AUTO PARTS CO., LTD., Danyang (CN)

(72) Inventors: Che-Wei Chang, New Taipei (TW); Cheng-Kai Yang, New Taipei (TW); Chuan-Chih Chang, New Taipei (TW)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 18/123,999

(22) Filed: Mar. 21, 2023

(51) Int. Cl.
*B60S 1/40* (2006.01)
*B60S 1/34* (2006.01)

(52) U.S. Cl.
CPC .......... *B60S 1/4003* (2013.01); *B60S 1/3436* (2013.01); *B60S 1/4048* (2013.01); *B60S 1/407* (2013.01); *B60S 2001/4051* (2013.01); *B60S 2001/4054* (2013.01); *B60S 2001/4058* (2013.01)

(58) Field of Classification Search
CPC .... B60S 1/4003; B60S 1/4038; B60S 1/4045; B60S 1/4048; B60S 1/4067; B60S 1/407; B60S 2001/4051; B60S 2001/4054; B60S 2001/4058; B60S 2001/4061
USPC ...................................................... 15/250.32
See application file for complete search history.

(56) References Cited

U.S. PATENT DOCUMENTS

| | | | |
|---|---|---|---|
| 8,707,506 B1 * | 4/2014 | Wu | B60S 1/4003 15/250.32 |
| 2015/0089764 A1 * | 4/2015 | Wu | B60S 1/4003 15/250.32 |
| 2021/0162956 A1 * | 6/2021 | Hyun | B60S 1/4045 |

FOREIGN PATENT DOCUMENTS

| | | | |
|---|---|---|---|
| DE | 202012102614 | * | 10/2012 |
| WO | 2011116995 | * | 9/2011 |
| WO | 2021170428 | * | 9/2021 |

* cited by examiner

*Primary Examiner* — Gary K. Graham
(74) *Attorney, Agent, or Firm* — Chun-Ming Shih; HDLS IPR SERVICES

(57) ABSTRACT

A universal wiper base assembly structure includes a fastening base, a rear base, a combination base, and an outer cover. The fastening base includes a main body and a decorative cover. The main body has a coupling hole, an insertion slot, a protruding platform, a positioning protrusion, a first shaft hole, two limiting arc surfaces, and multiple engagement grooves. The decorative cover has a fastening slot. The rear base includes two contact blocks, a top abutting block, and two hooks. The combination base includes two side plates, a connection plate, an open groove and a second shaft hole. The outer cover includes a fastening block, an opening, and a third shaft hole. Accordingly, a variety of wiper driving arms may be positioned to the universal wiper base assembly structure, so as to improve the convenience in assembling and reduce an overall cost.

10 Claims, 18 Drawing Sheets

UNIVERSAL WIPER BASE ASSEMBLY STRUCTURE

TECHNICAL FIELD

The present disclosure relates to a windscreen wiper, and in particular, to a wiper base assembly structure for accommodating a variety of wiper driving arms.

DESCRIPTION OF RELATED ART

Generally, car windscreen wipers need to be assembled on outer sides of car windscreens by connecting wiper driving arms. The wiper driving arms exert force on wiper rubber strips (or blades) to scrape off the rain or stains on glass surfaces by driving the wipers to swing back and forth on the glass surfaces.

Furthermore, the wiper driving arm is usually mounted and fixed on a wiper base assembly structure. There are a variety of wiper driving arms provided by automobile manufacturers to match different automobile model. Therefore, in order to accommodate all kinds of wiper driving arms, the wipers need various specific base assembly structure. As a result, most windscreen wiper manufacturers provide multiple base assemblies to allow users to choose a suitable base assembly for assembling. However, this not only increases an overall price of the wiper, but also wastes components, which is a problem needs to be solved.

In light of the above, the inventor of the present disclosure has devoted himself to doing research and studying scientific principles so as to solve the above problem of related art.

SUMMARY OF THE DISCLOSURE

It is an objective of the present disclosure to provide a universal wiper base assembly structure. A variety of the wiper driving arms may be positioned through the fastening base being selectively coupled with the rear base, the combination base, or/and the outer cover to increase conveniences during using.

Accordingly, the present disclosure provides a universal wiper base assembly structure for accommodating a variety of wiper driving arms, the universal wiper base assembly including: a fastening base, a rear base, a combination base, and an outer cover. The fastening base includes a main body and a decorative cover. The main body includes a coupling hole defined at a bottom, an insertion slot defined at a top, a protruding platform, a positioning protrusion disposed on the protruding platform, a first shaft hole defined at a lateral side, two limiting arc surfaces disposed on opposite sides, and a plurality of engagement grooves defined on a bottom surface. The decorative cover is rotatably connected to a front side of the main body and includes a fastening slot. The rear base includes two contact blocks disposed on opposite sides, a top abutting block abutting against the positioning protrusion, a trench defined in front of the top abutting block, and two hooks disposed in front of the top abutting block. The rear base is detachably coupled to a rear side of the main body through the two hooks being engaged with the main body. The combination base is detachably coupled to a top surface of the main body and positioned in the trench. The combination base includes two side plates, a connection plate located between the two side plates, and an open groove defined at a position corresponding to the protruding platform and the positioning protrusion. Each of the side plates includes a second shaft hole defined at a position corresponding to the first shaft hole. The outer cover includes a fastening block, an opening exposing the protruding platform and the positioning protrusion and a third shaft hole defined at a position corresponding to one of the second shaft holes. The outer cover is removably fixed to the combination base by the fastening block being engaged with the fastening slot. The variety of the wiper driving arms are positioned through the fastening base selectively being coupled with the rear base, the combination base, or/and the outer cover.

Comparing with the related art, the universal wiper base assembly structure of the present application includes a fastening base, a rear base, a combination base, and an outer cover. The fastening base includes positioning structures such as a coupling hole, an insertion slot, a protruding platform, a positioning protrusion, a first shaft hole, multiple limiting arc surfaces, multiple engagement grooves, and a fastening slot. The rear base includes positioning structures such as multiple contact blocks, a top abutting block, and two hooks. The combination base includes an open groove and a second shaft hole. The outer cover includes a fastening block, an opening, and a third shaft hole. Accordingly, a variety of wiper driving arms may be positioned through the fastening base being selectively coupled with the rear base, the combination base, or/and the outer cover, so as to improve the convenience in assembling and reduce an overall cost of the wiper.

DETAILED DESCRIPTION

A detailed description and technical content of the present disclosure are provided below with reference to accompanying drawings. However, the accompanying drawings are only for illustrative purposes and are not intended to limit the present disclosure.

Figure 1:
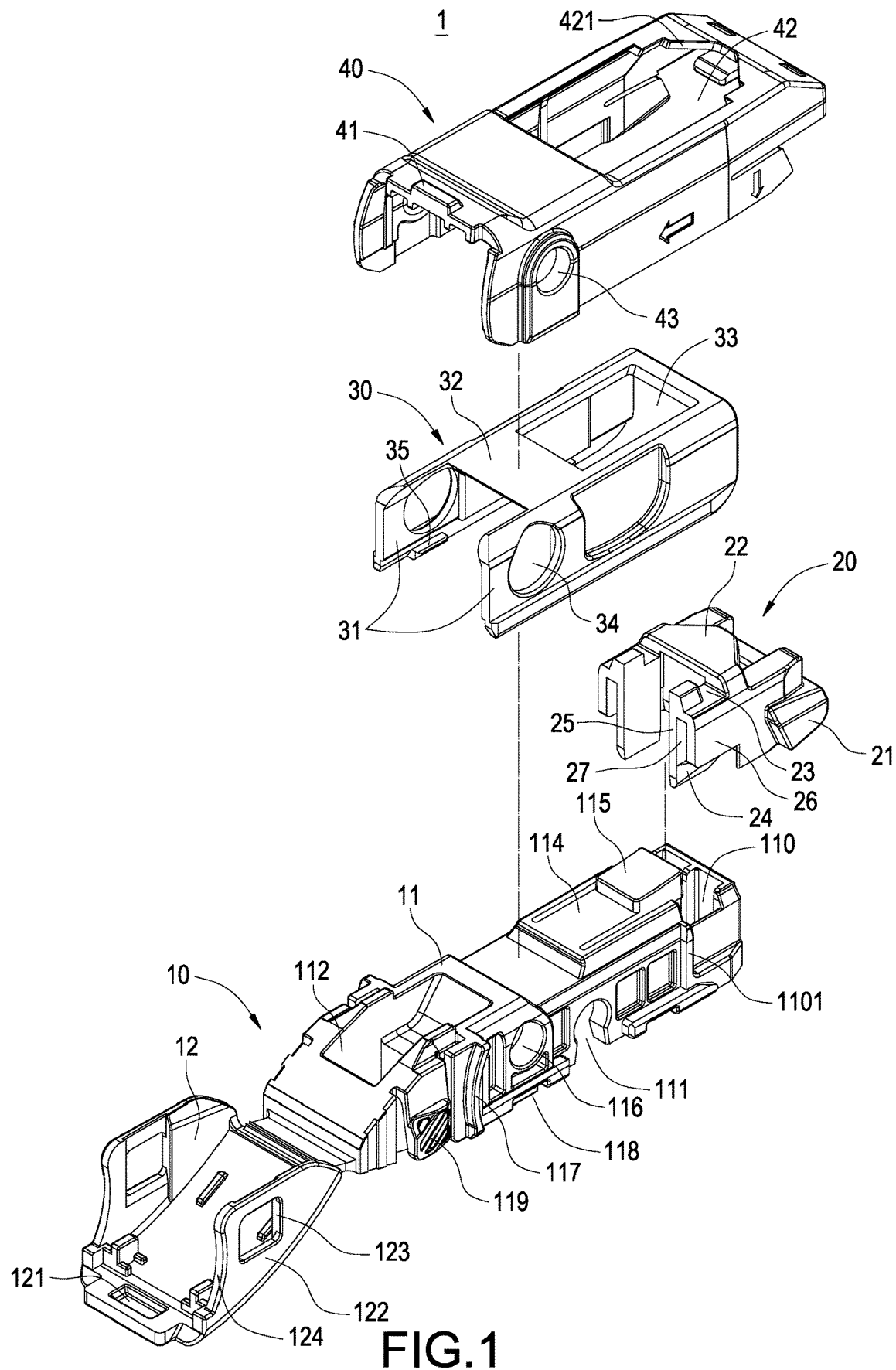
FIG. 1 and FIG. 2 are perspective exploded views from two side directions, showing a universal wiper base assembly structure of the present disclosure.
Figure 2:
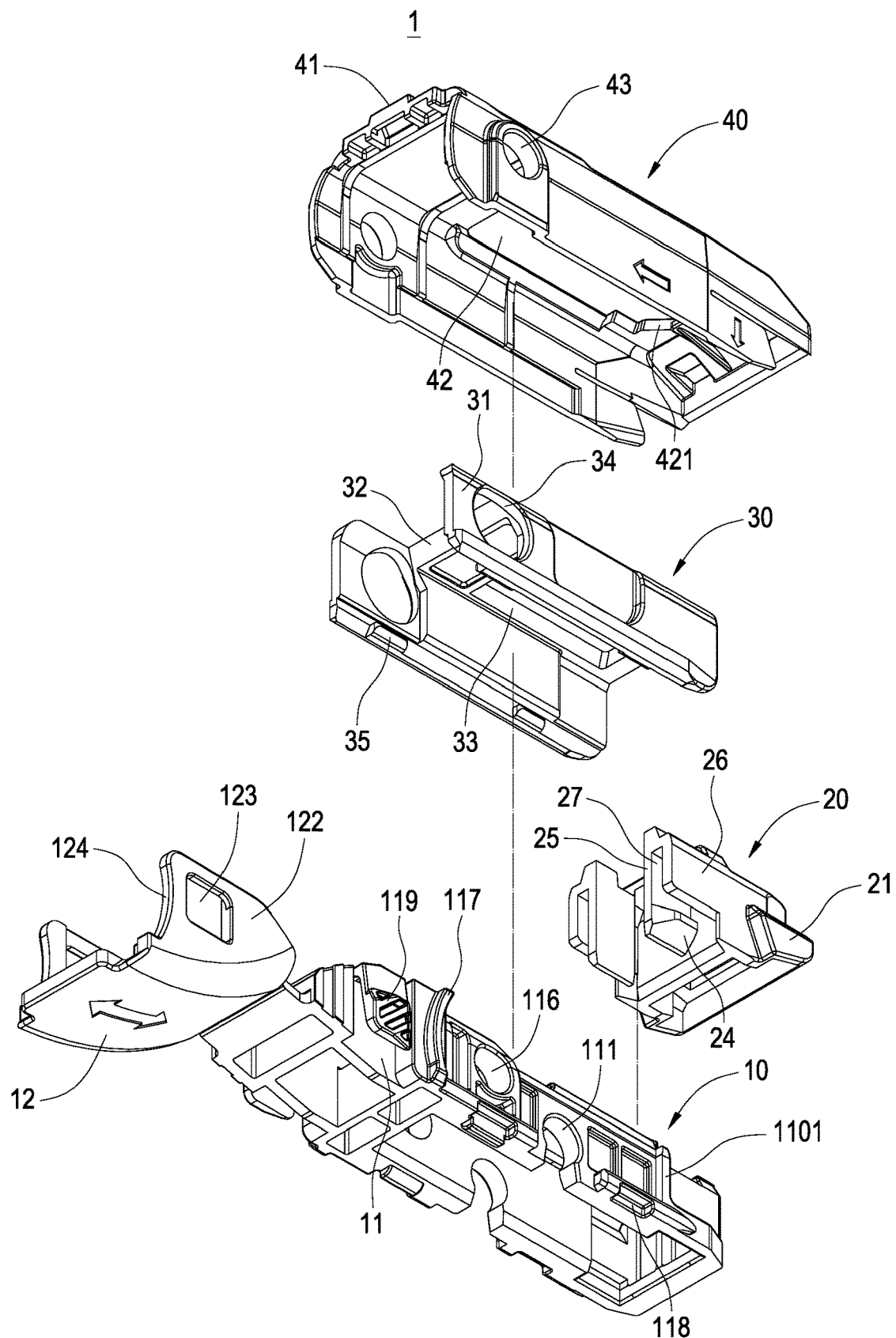
Figure 3:
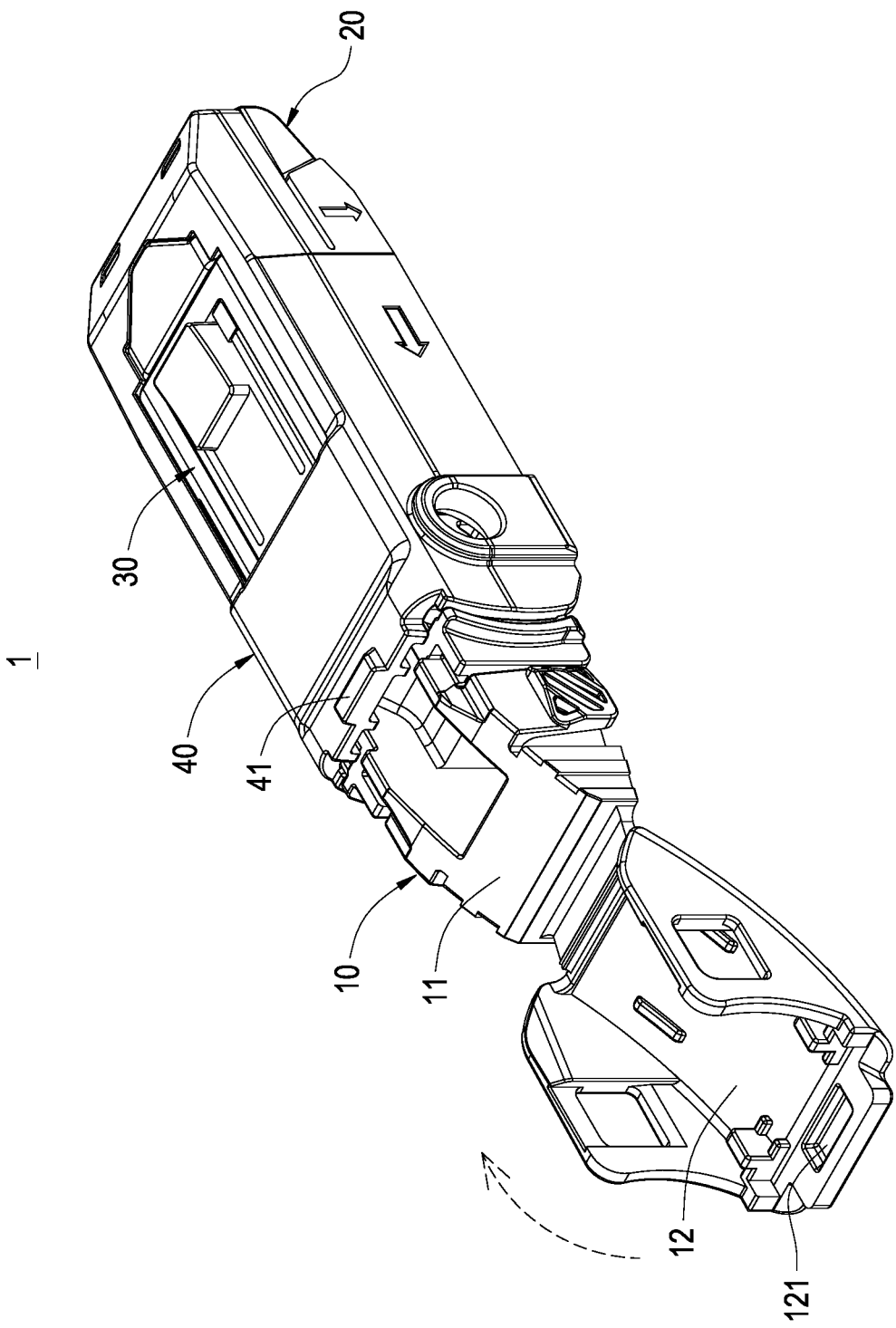
FIG. 3 is a perspective appearance view showing the universal wiper base assembly structure of the present disclosure.

Please refer to FIGS. 1 to 3, which are perspective exploded views showing a universal wiper base assembly structure of the present disclosure viewed from two side directions and a perspective appearance view showing the universal wiper base assembly structure of the present disclosure. The present disclosure is a universal wiper base assembly structure 1, which includes a fastening base 10, a rear base 20, a combination base 30, and an outer cover 40. The rear base 20, the combination base 30, and the outer cover 40 may be selectively coupled to the fastening base 10, so as to position and couple a variety of wiper driving arms. A more detailed description of the universal wiper base assembly structure 1 is provided below.

The fastening base 10 includes a main body 11 and a decorative cover 12. The main body 11 includes a coupling hole 111 at a bottom, an insertion slot 112 at a top, a protruding platform 114, a positioning protrusion 115 arranged on the protruding platform 114, a first shaft hole 116 at a lateral side, two limiting arc surfaces 117 disposed on opposite sides, and a plurality of engagement grooves 118 on a bottom surface. Moreover, the decorative cover 12 is rotatably connected to a front side of the main body 11 and includes a fastening slot 121.

Specifically, the main body 11 is provided with an engagement plate 119 in front of each of the limiting arc surfaces 117. Moreover, the decorative cover 12 includes two wing plates 122. Each of the wing plates 122 is provided with an engagement slot 123. The decorative cover 12 is fastened to the main body 11 through the engagement slots 123 being engaged with the engagement plates 119 (see also FIG. 4). In addition, each wing plate 122 includes a positioning arc surface 124. Each of the limiting arc surfaces 117 abuts against the positioning arc surface 124 of one of the wing plates 122.

The rear base 20 includes two contact blocks 21 disposed on opposite sides, a top abutting block 22 abutting against the positioning protrusion 115, a trench 23 defined in front of the top abutting block 22, and two hooks 24 arranged in front of the top abutting block 22. The rear base 20 is detachably coupled to a rear side of the main body 11 through the two hooks 24 being engaged with the main body 11.

In detail, the main body 11 is provided with two insertion grooves 110 defined on a rear side of the positioning protrusion 115. Moreover, the rear base 20 is provided with two insertion plates 25 disposed on one side of the trench 23. The two insertion plates 25 are inserted in the two insertion grooves 110. Moreover, the rear base 20 includes two abutting surfaces 26 located in front of the two abutting blocks 21. An insertion recess 27 contacting a sidewall of the main body 11 is defined between each of the abutting surfaces 26 and each of the insertion plates 25.

In the present embodiment, the main body 11 includes two blocking plates 1101 disposed on two sides of the protruding platform 114. Further, an end surface of the rear base 20 abuts against the two blocking plates 1101.

Moreover, the combination base 30 is detachably coupled to a top surface of the main body 11 and positioned in the trench 23. The combination base 30 includes two side plates 31, a connection plate 32 located between the two side plates 31, and an open groove 33 defined at a position corresponding to the protruding platform 114 and the positioning protrusion 115. Each of the side plates 31 includes a second shaft hole 34 defined at a position corresponding to the first shaft hole 116.

In the present embodiment, the combination base 30 is provided with a plurality of protruding ribs 35 on inner sides of the two side plates 31. The protruding ribs 35 are positioned in the engagement grooves 118 of the main body 11.

The outer cover 40 covers the combination base 30. The outer cover 40 includes a fastening block 41, an opening 42 exposing the protruding platform 114 and the positioning protrusion 115 and a third shaft hole 43 defined at a position corresponding to the second shaft hole 34. The decorative cover 12 is rotatable toward the main body 11. The outer cover 40 is removably fixed to the combination base 30 by the fastening block 41 being engaged with the fastening slot 121 (see FIG. 3).

It should be noted that the opening 42 of the outer cover 40 includes an abutting portion 421. The profile of the abutting portion 421 is corresponding to a shape of the top abutting block 22. Accordingly, when the outer cover 40 covers the combination base 30, the opening 42 encloses and surrounds the protruding platform 114, the positioning protrusion 115, and the top abutting block 22.

Figure 4:
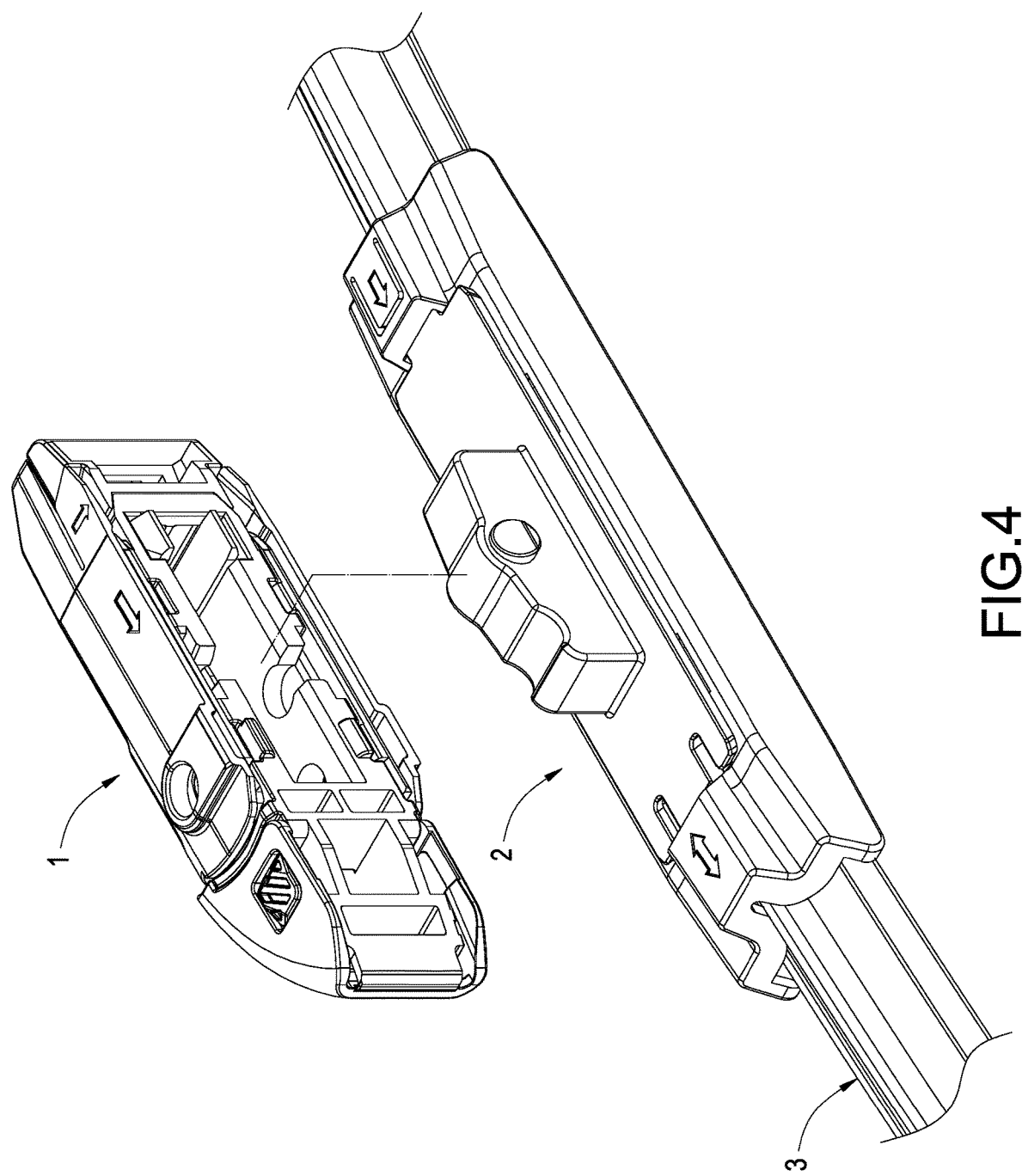
FIG. 4 is a schematic assembling view showing that the universal wiper base assembly structure of the present disclosure is coupled to a wiper base.
Figure 5:
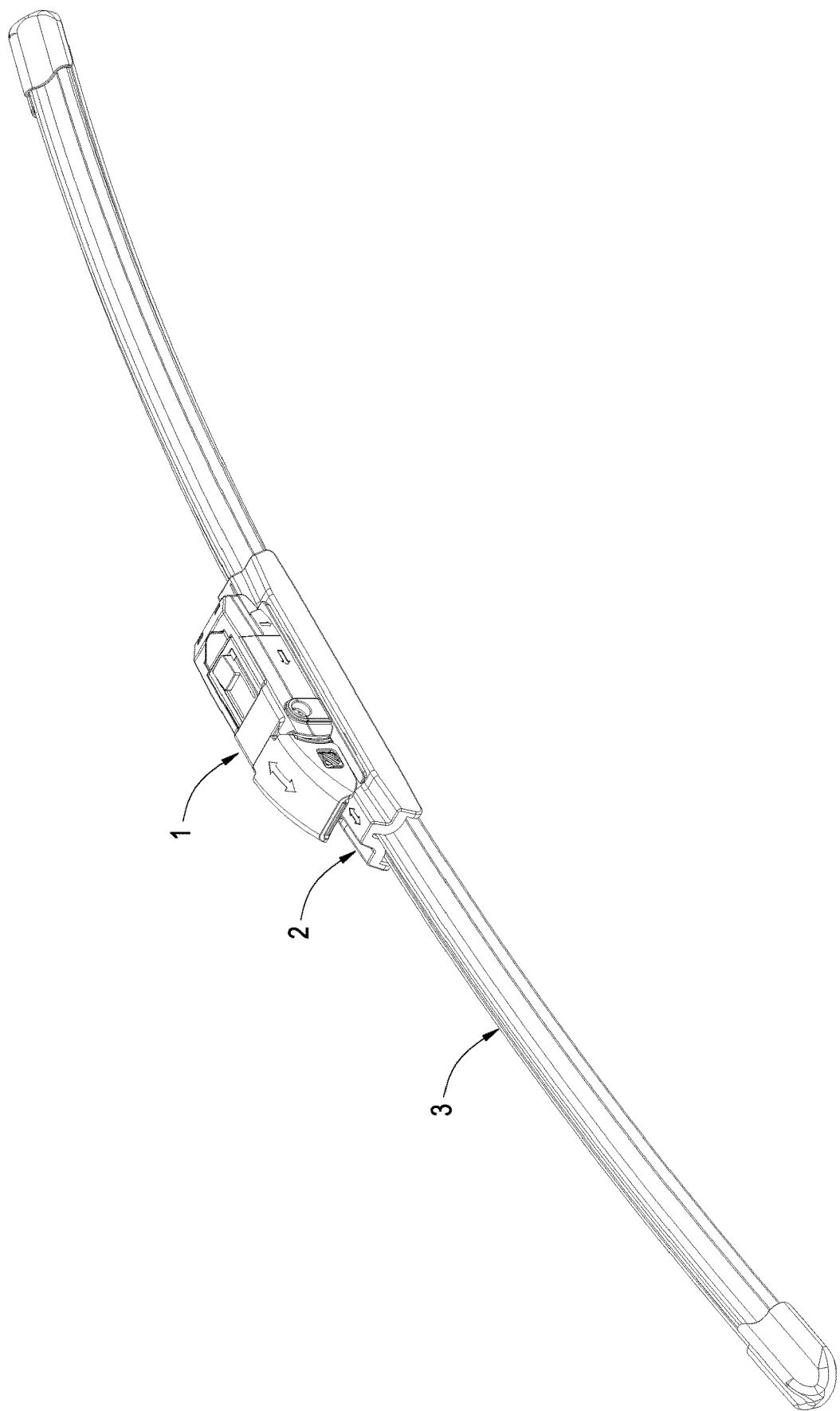
FIG. 5 is a perspective appearance view showing a wiper of the present disclosure.

Please refer to FIG. 4 and FIG. 5. FIG. 4 is a schematic assembling view showing that the universal wiper base assembly structure of the present disclosure is coupled to a wiper base, and FIG. 5 is a perspective appearance view showing a wiper of the present disclosure. The universal wiper base assembly structure 1 of the present disclosure is configured to be installed on a wiper base 2. Moreover, the wiper base 2 is further combined with a wiper blade 3 to form a wiper.

Figure 6:
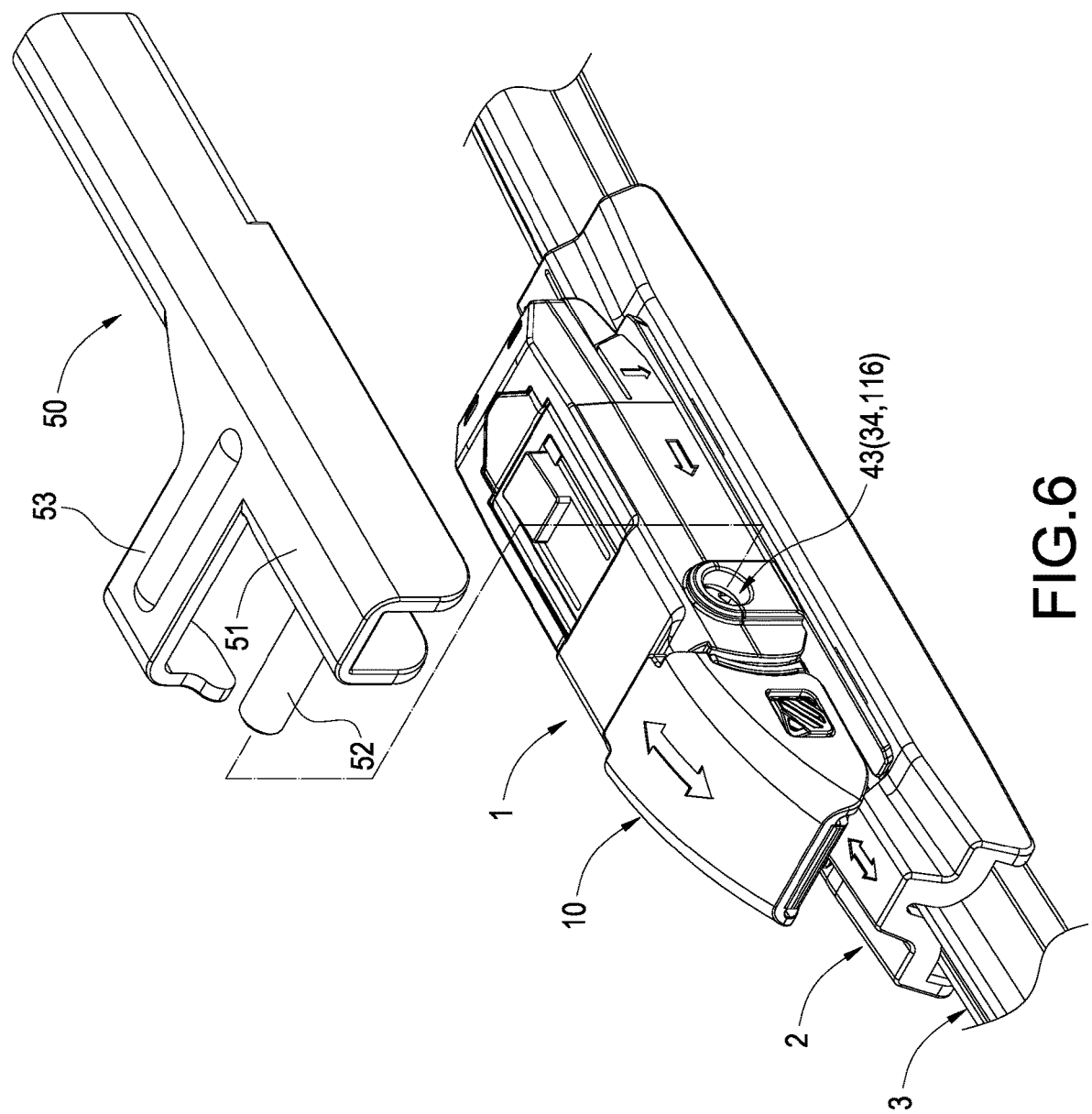
FIG. 6 is a schematic assembling view showing that the universal wiper base assembly structure of the present disclosure is coupled to a first wiper driving arm.
Figure 7:
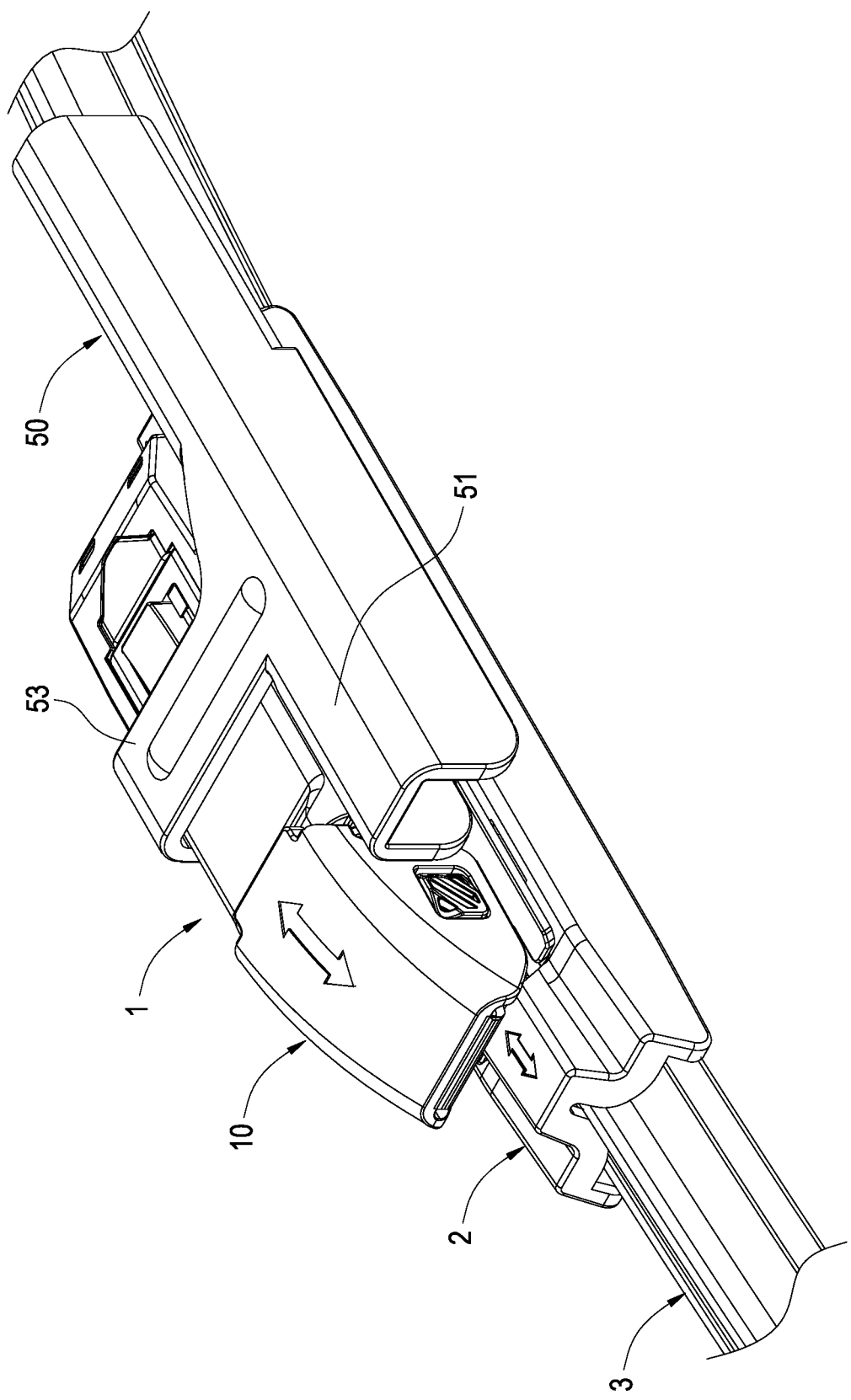
FIG. 7 is a perspective appearance view showing the universal wiper base assembly structure of the present disclosure after assembling.

Please refer to FIG. 6 and FIG. 7. FIG. 6 is a schematic assembling view showing that the universal wiper base assembly structure of the present disclosure is coupled to a first wiper driving arm. FIG. 7 is a perspective appearance view showing the universal wiper base assembly structure of the present disclosure after assembling. In the present embodiment, the universal wiper base assembly structure 1 is structured by combining the rear base 20, the combination base 30, and the outer cover 40 with the fastening base 10 (see FIG. 3). Furthermore, the first wiper driving arm 50 includes a first arm body 51, an insertion shaft 52 connected to a lateral side of the first arm body 51, and a span arm 53 transversely extended from a top surface of the first arm body 51.

In actual assembling, the insertion shaft 52 passes through the third shaft hole 43, the second shaft hole 34, and the first shaft hole 116. The first arm body 51 abuts against a left side of the fastening base 10, and the span arm 53 straddles the outer cover 40. Accordingly, the first wiper driving arm 50 is coupled to the universal wiper base assembly structure 1 to drive the wiper blade 3 to move. It should be noted that the universal wiper base assembly structure 1 may also be combined with a right-side-type first wiper driving arm 50 to couple the same on a right side of the fastening base 1.

Figure 8:
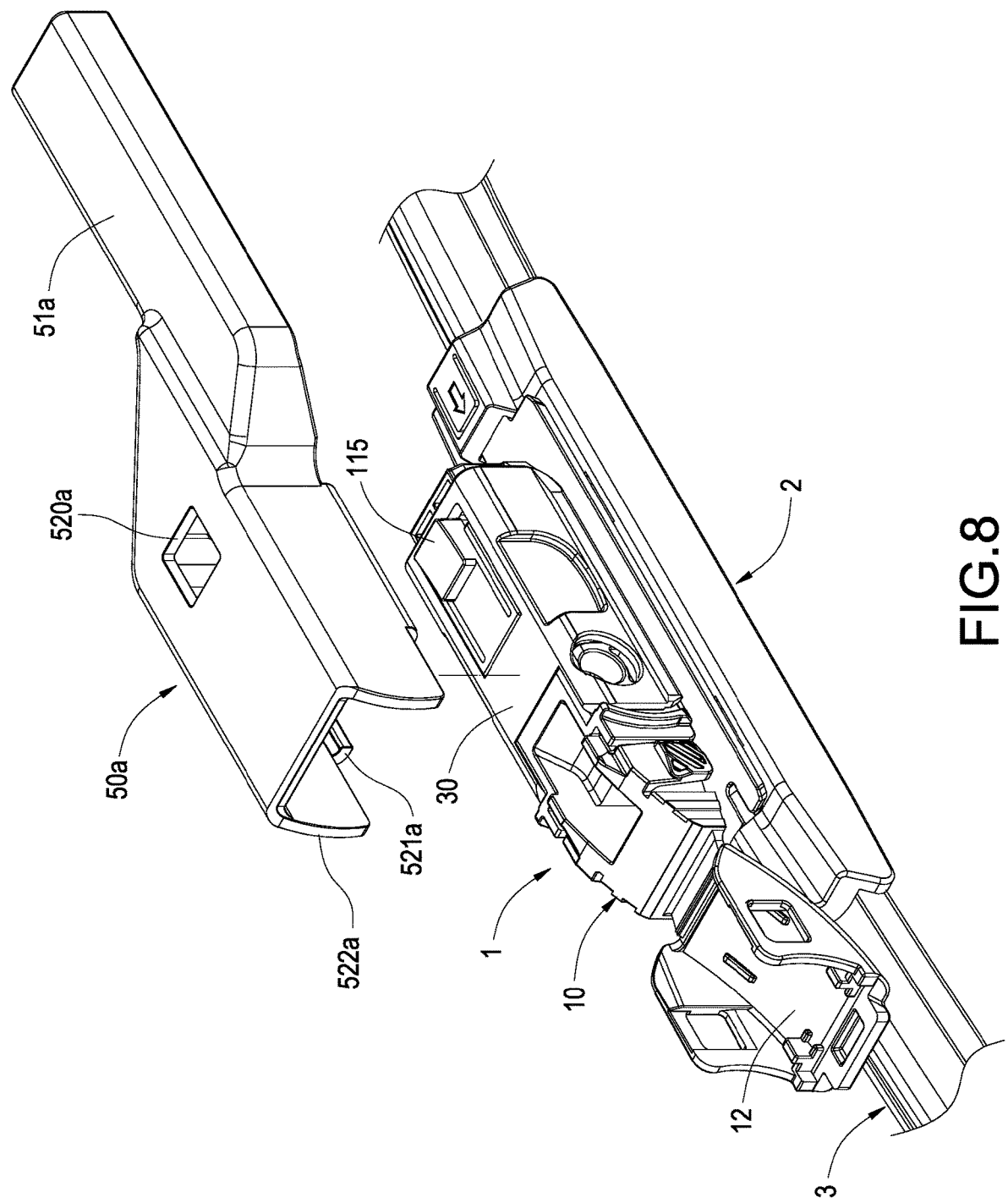
FIG. 8 is a schematic assembling view showing that the universal wiper base assembly structure of the present disclosure is coupled to a second wiper driving arm.
Figure 9:
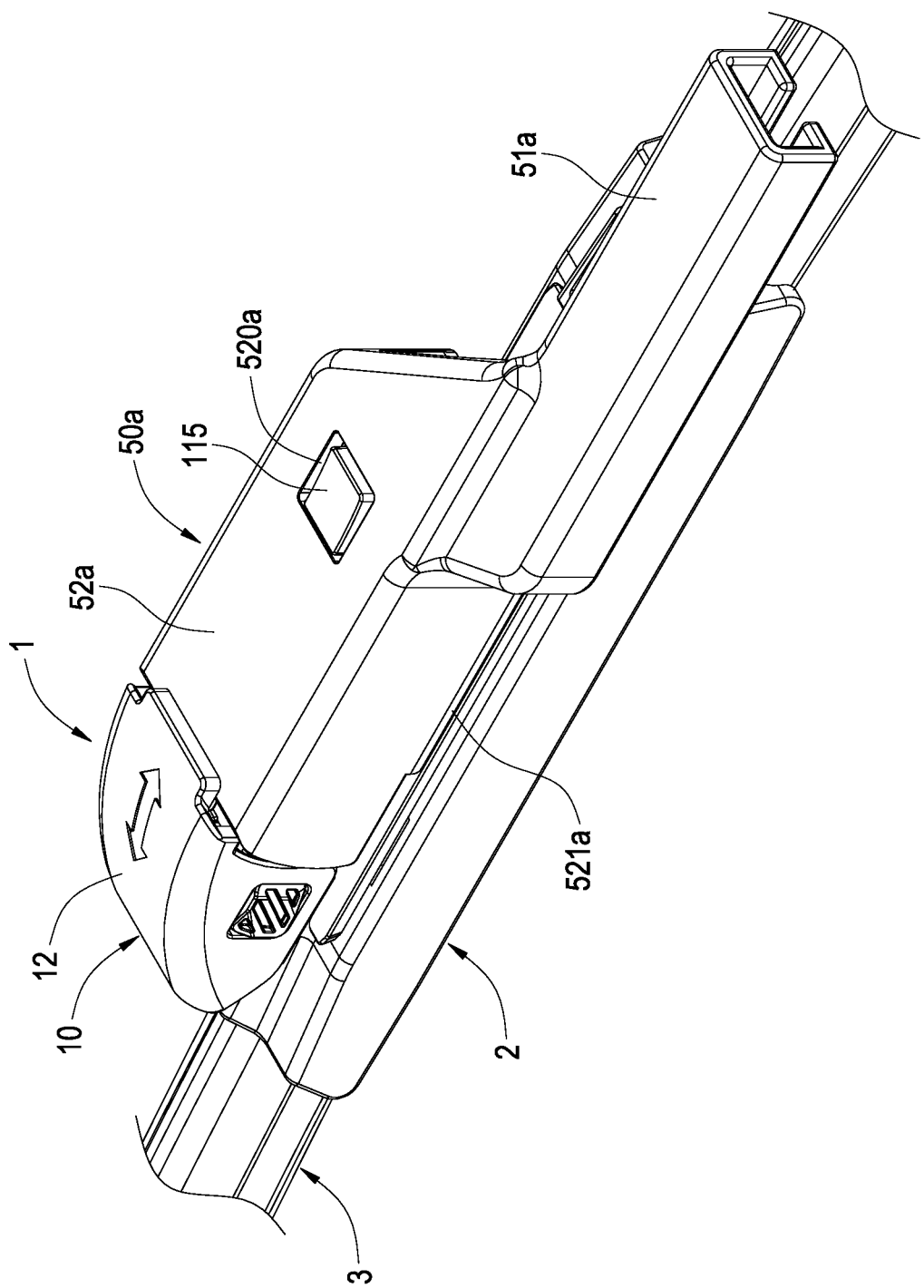
FIG. 9 and FIG. 10 are perspective appearance views from two side directions, showing that the universal wiper base assembly structure of the present disclosure is coupled to the second wiper driving arm.
Figure 10:
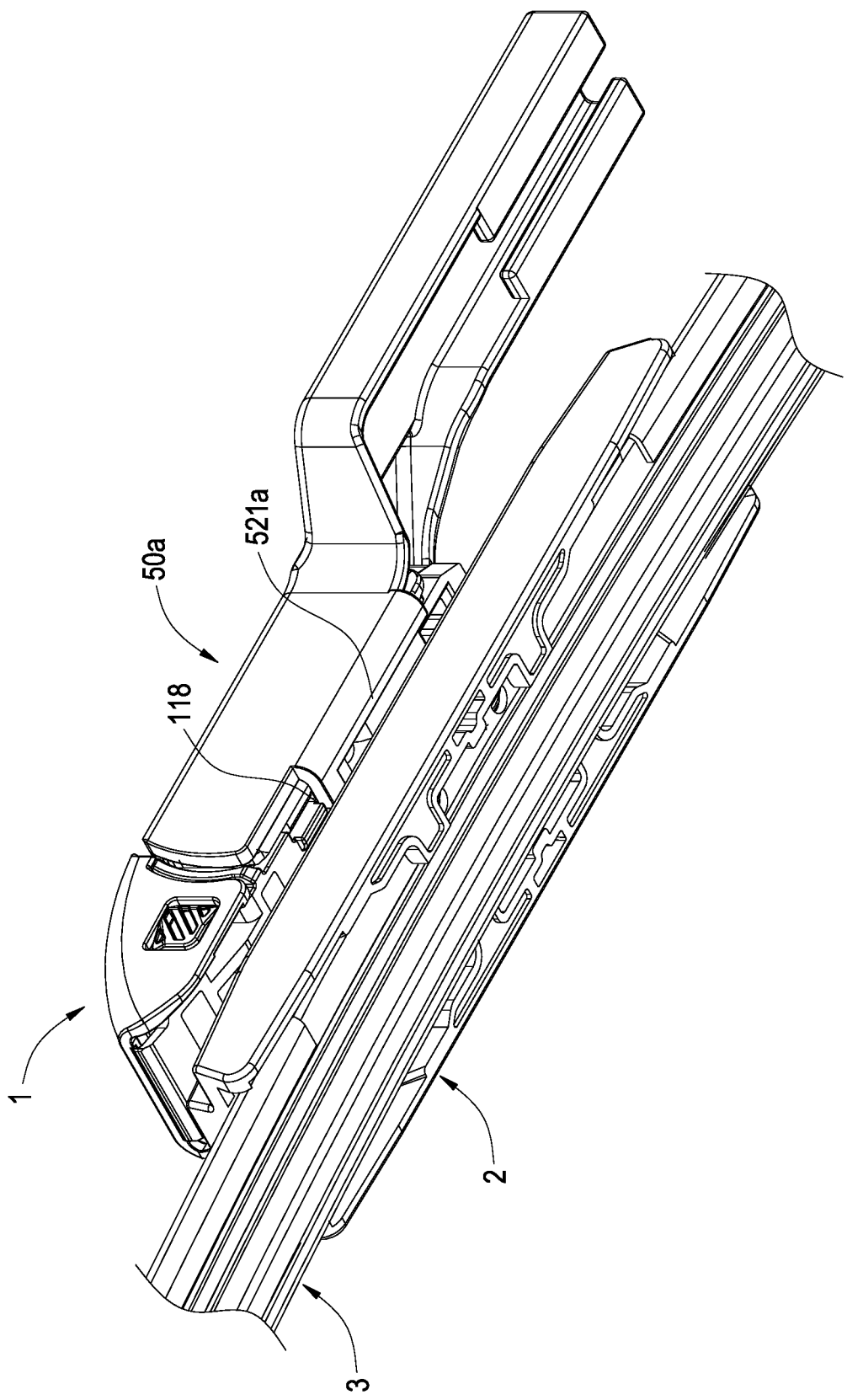

Please continue to refer to FIG. 8 to FIG. 10. FIG. 8 is a schematic assembling view showing that the universal wiper base assembly structure of the present disclosure is coupled to a second wiper driving arm. FIG. 9 and FIG. 10 are perspective appearance views from two side directions, showing that the universal wiper base assembly structure of the present disclosure is coupled to the second wiper driving arm. In the present embodiment, the universal wiper base assembly structure 1 is structured by removing the outer cover 40 and the rear base 20, and only coupling the combination base 30 to the fastening base 10. The positioning protrusion 115 protrudes from the open groove 33 of the combination base 30. Moreover, a second wiper driving arm 50a includes a second arm body 51a and a shielding cover 52a connected to the second arm body 51a. In addition, a top of the shielding cover 52a is provided with a fastening hole 520a, a bottom of the shielding cover 52a is provided with a plurality of hooks 521a, and a front end of the shielding cover 52a is provided with a plurality of positioning end surfaces 522a.

In actual assembling, the shielding cover 52a covers the combination base 30. The positioning protrusion 115 passes through the fastening hole 520a. The hooks 521a on the bottom of the shielding cover 52a are engaged with the engagement grooves 118 on the bottom of the fastening base 10, and the decorative cover 12 of the fastening base 10 presses the shielding cover 52a. Accordingly, the second wiper driving arm 50a is coupled to the universal wiper base assembly structure 1 to drive the wiper blade 3 to move.

Figure 11:
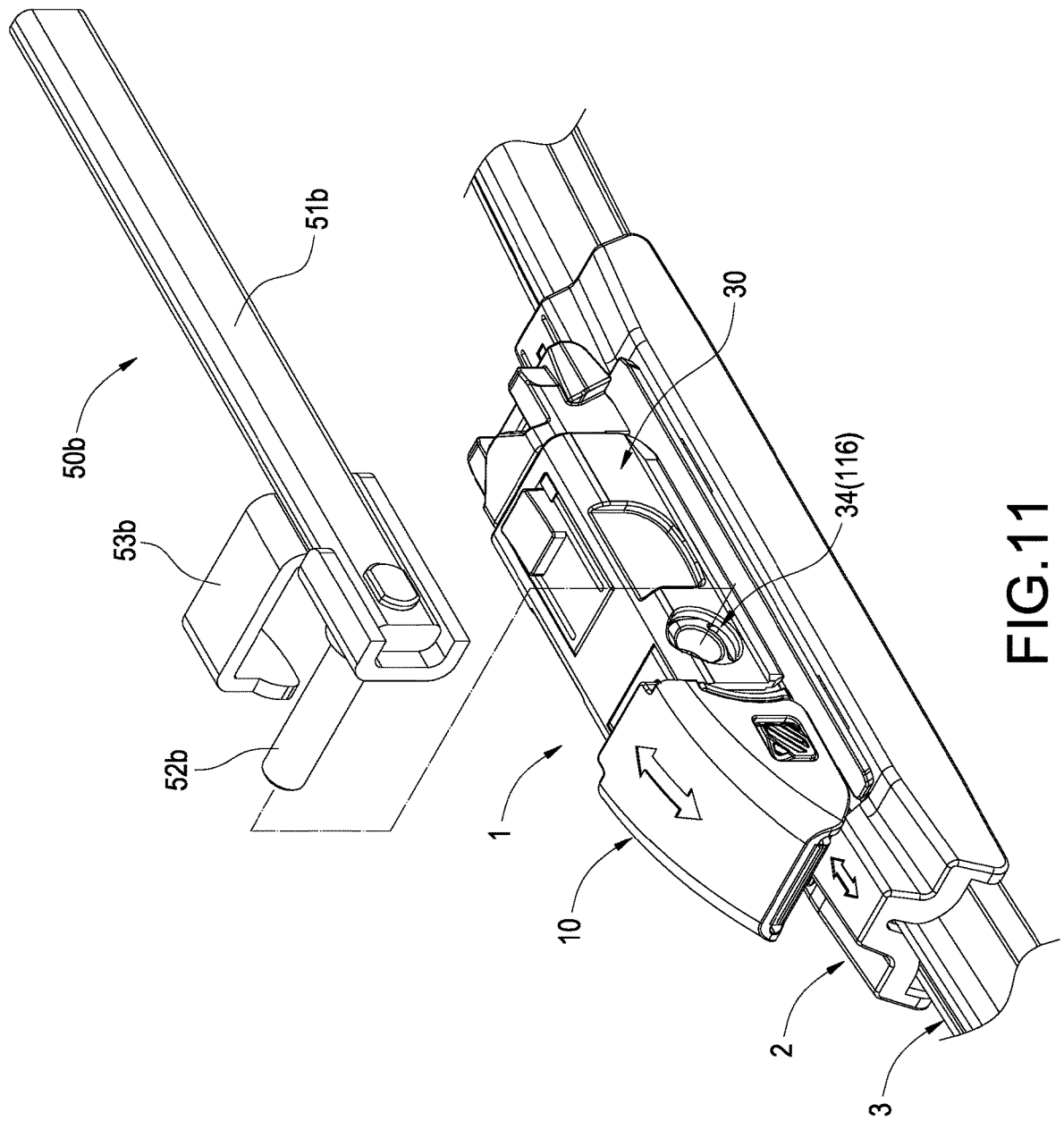
FIG. 11 is a schematic assembling view showing that the universal wiper base assembly structure of the present disclosure is coupled to a third wiper driving arm.
Figure 12:
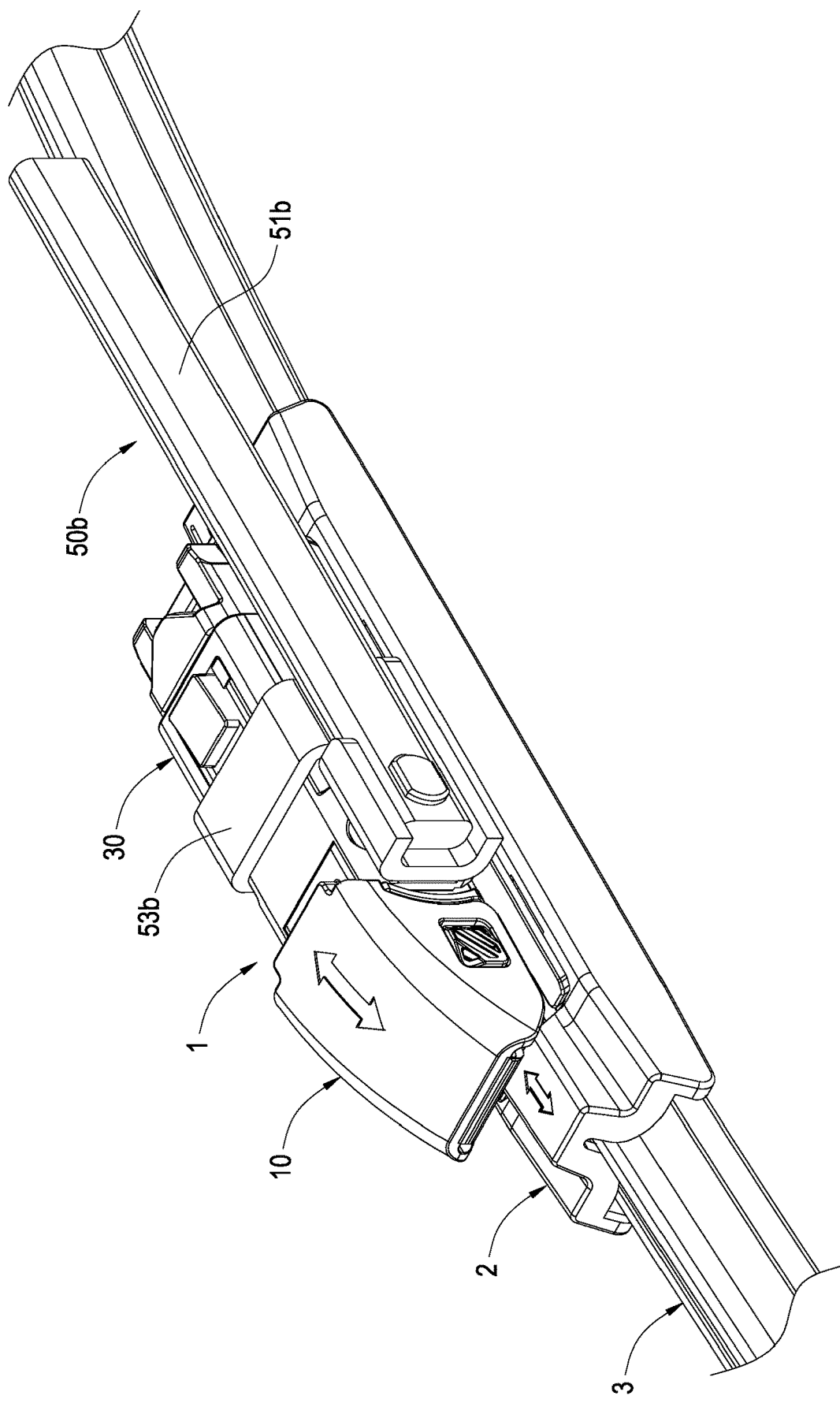
FIG. 12 is a schematic appearance view showing that the universal wiper base assembly structure of the present disclosure is coupled to the third wiper driving arm.

Please refer to FIG. 11 and FIG. 12. FIG. 11 is a schematic assembling view showing that the universal wiper base assembly structure of the present disclosure is coupled to a third wiper driving arm. FIG. 12 is a schematic appearance view showing that the universal wiper base assembly structure of the present disclosure is coupled to the third wiper driving arm. In the present embodiment, the universal wiper base assembly structure 1 is structured by reserving the fastening base 10 and the combination base 30. That is to say, the outer cover 40 and the rear base 20 are removed from the fastening base 10. Moreover, a third wiper driving arm 50b includes a third arm body 51b, an insertion shaft 52b connected to a lateral side of the third arm body 51b, and a span arm 53b transversely extended from a top surface of the third arm body 51b.

In actual assembling, the insertion shaft 52b passes through the third shaft hole 43, and the third arm body 51b abuts against a left side of the fastening base 10. The span arm 53b straddles the outer cover 40. Accordingly, the third wiper driving arm 50b is coupled to the universal wiper base assembly structure 1 to drive the wiper blade 3 to move.

Figure 13:
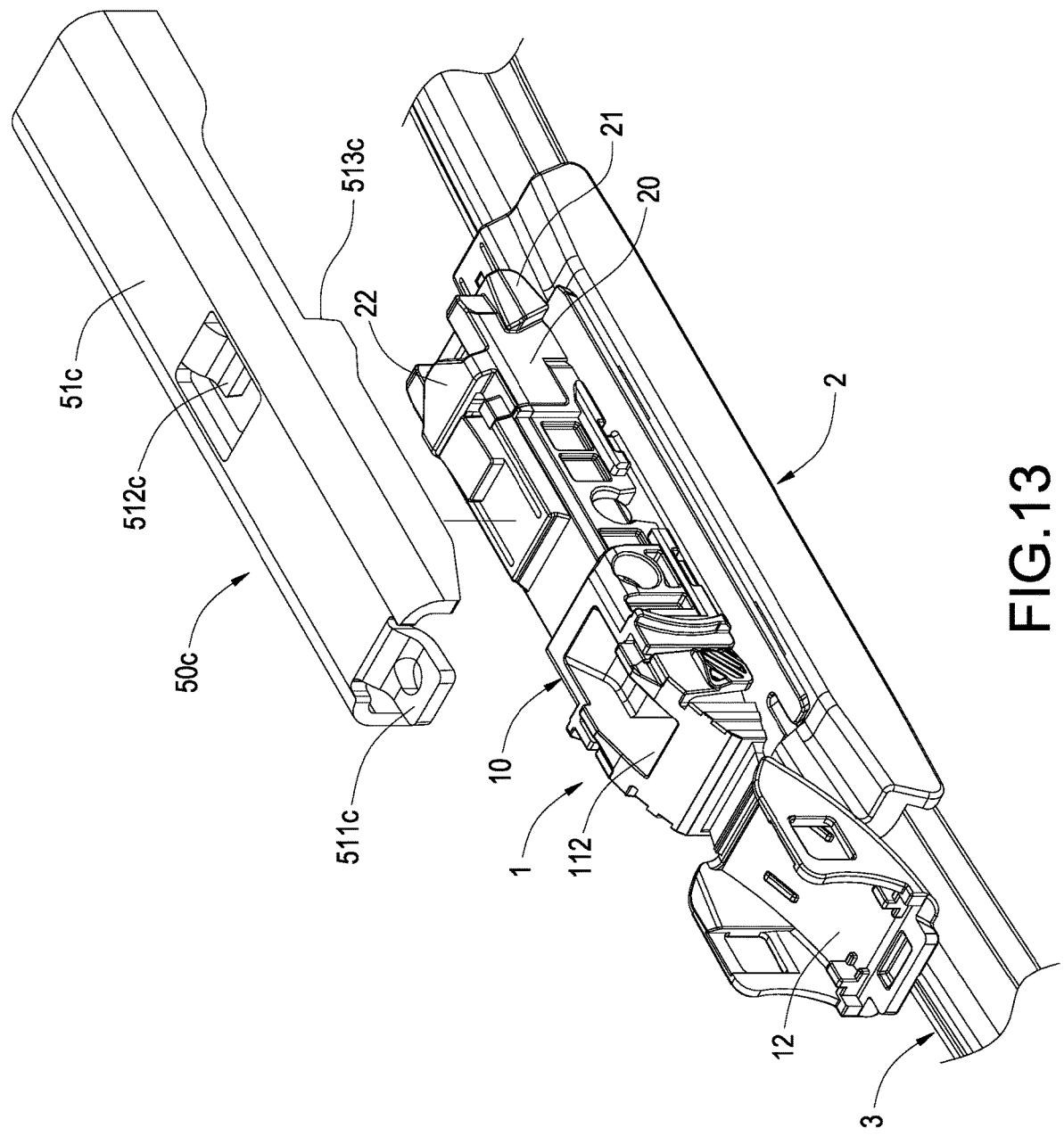
FIG. 13 is a schematic assembling view showing that the universal wiper base assembly structure of the present disclosure is coupled to a fourth wiper driving arm.
Figure 14:
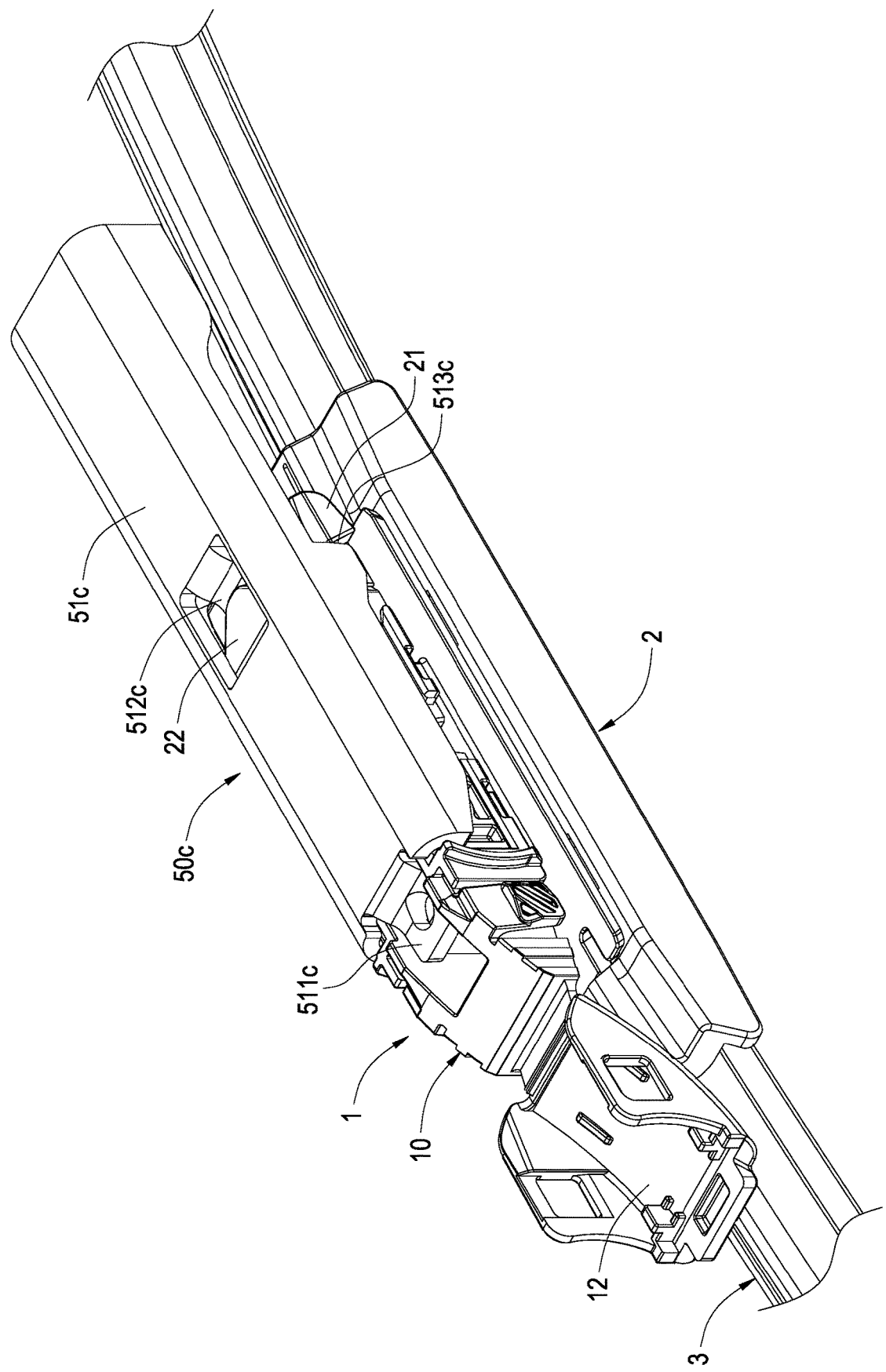
FIG. 14 and FIG. 15 are perspective appearance views from two side directions, showing that the universal wiper base assembly structure of the present disclosure is coupled to the fourth wiper driving arm.
Figure 15:
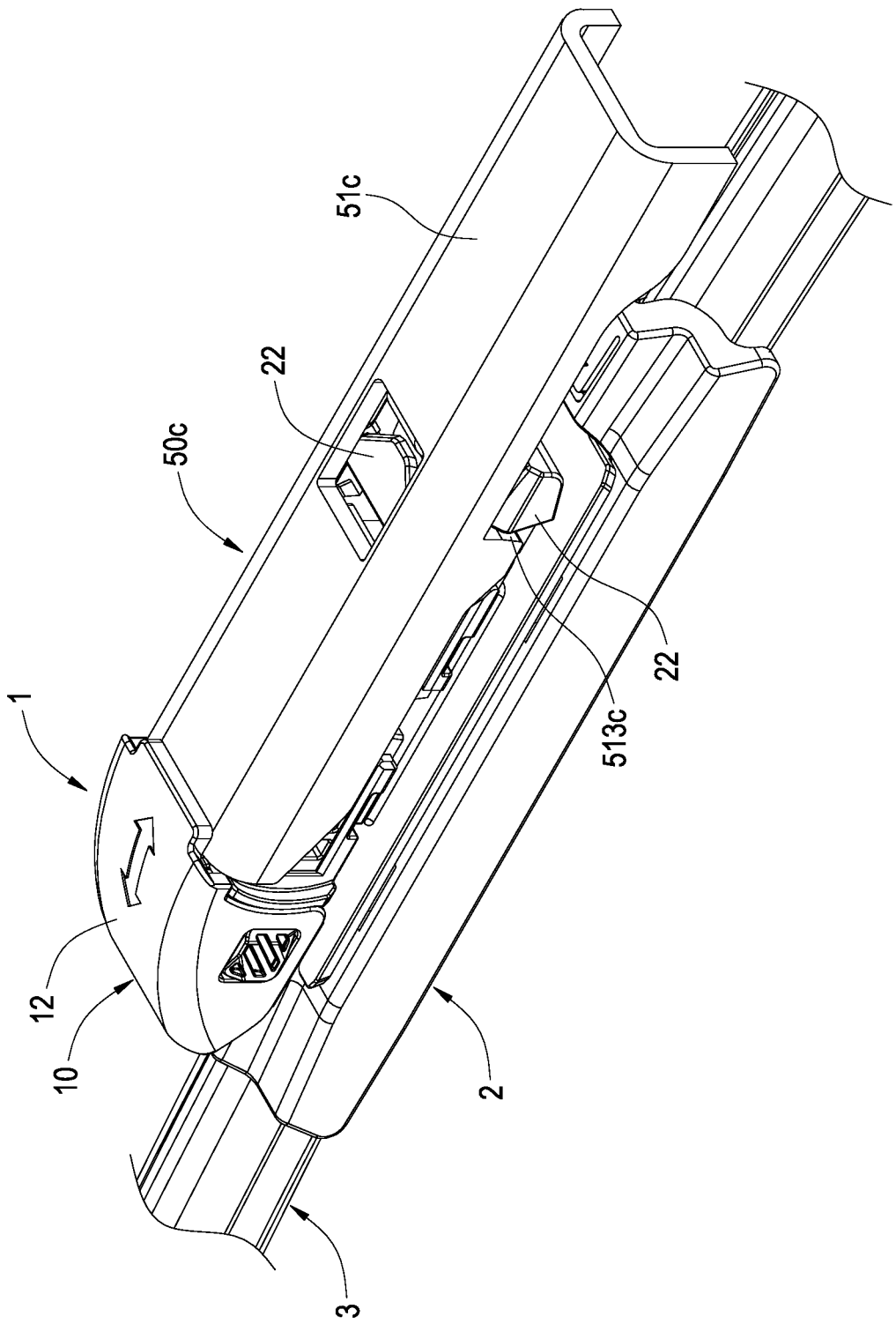

Please refer to FIG. 13 to FIG. 15. FIG. 13 is a schematic assembling view showing that the universal wiper base assembly structure of the present disclosure is coupled to a fourth wiper driving arm. FIG. 14 and FIG. 15 are perspective appearance views from two side directions, showing that the universal wiper base assembly structure of the present disclosure is coupled to the fourth wiper driving arm. In the present embodiment, the universal wiper base assembly structure 1 is structured by removing the outer cover 40 and the combination base 30, and only combining the rear base 20 with the fastening base 10. Moreover, the fastening base 10 has an insertion slot 112. The rear base 20 includes two contact blocks 21 and a top abutting block 22. A fourth wiper driving arm 50c includes a fourth arm body 51c, and the fourth arm body 51c is a U-shaped cover. The fourth arm body 51c is provided with a protruding plate 511c, an abutting plate 512c, and a limiting plate 513c. It should be noted that the fourth arm body 51c may be dispensed with the abutting plate 512c.

In actual assembling, the fourth arm body 51c covers the fastening base 10 and the rear base 20. The protruding plate 511c of the fourth wiper driving arm 50c is inserted into the insertion slot 112 of the fastening base 10, the abutting plate 512c abuts against the top abutting block 22, and the limiting plate 513c abuts against the contact block 21. In addition to that, the decorative cover 12 of the fastening base 10 presses the shielding cover 52a. Accordingly, the fourth wiper driving arm 50c is coupled to the universal wiper base assembly structure 1 to drive the wiper blade 3 to move.

Figure 16:
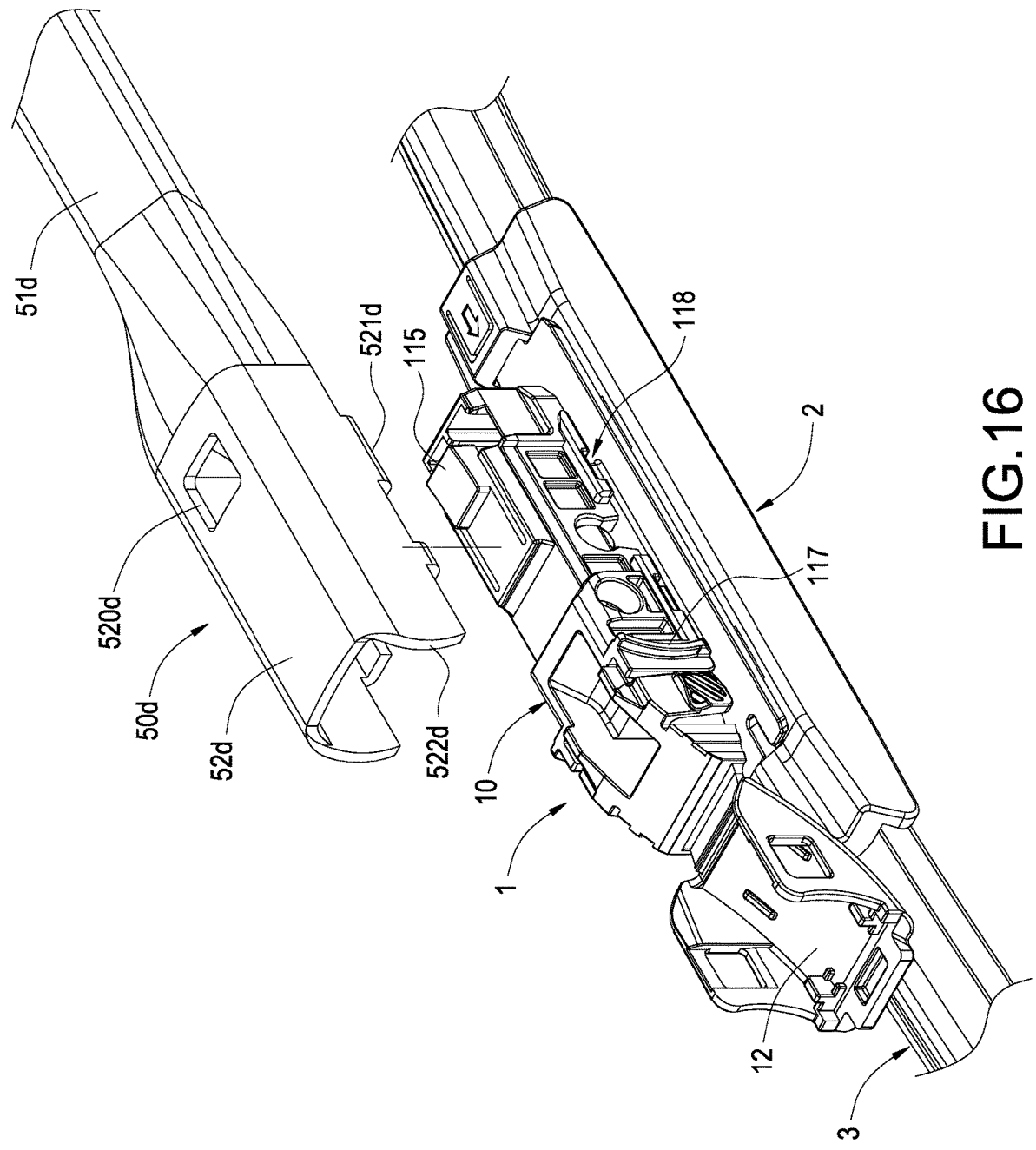
FIG. 16 is a schematic assembling view showing that the universal wiper base assembly structure of the present disclosure is coupled to a fifth wiper driving arm.
Figure 17:
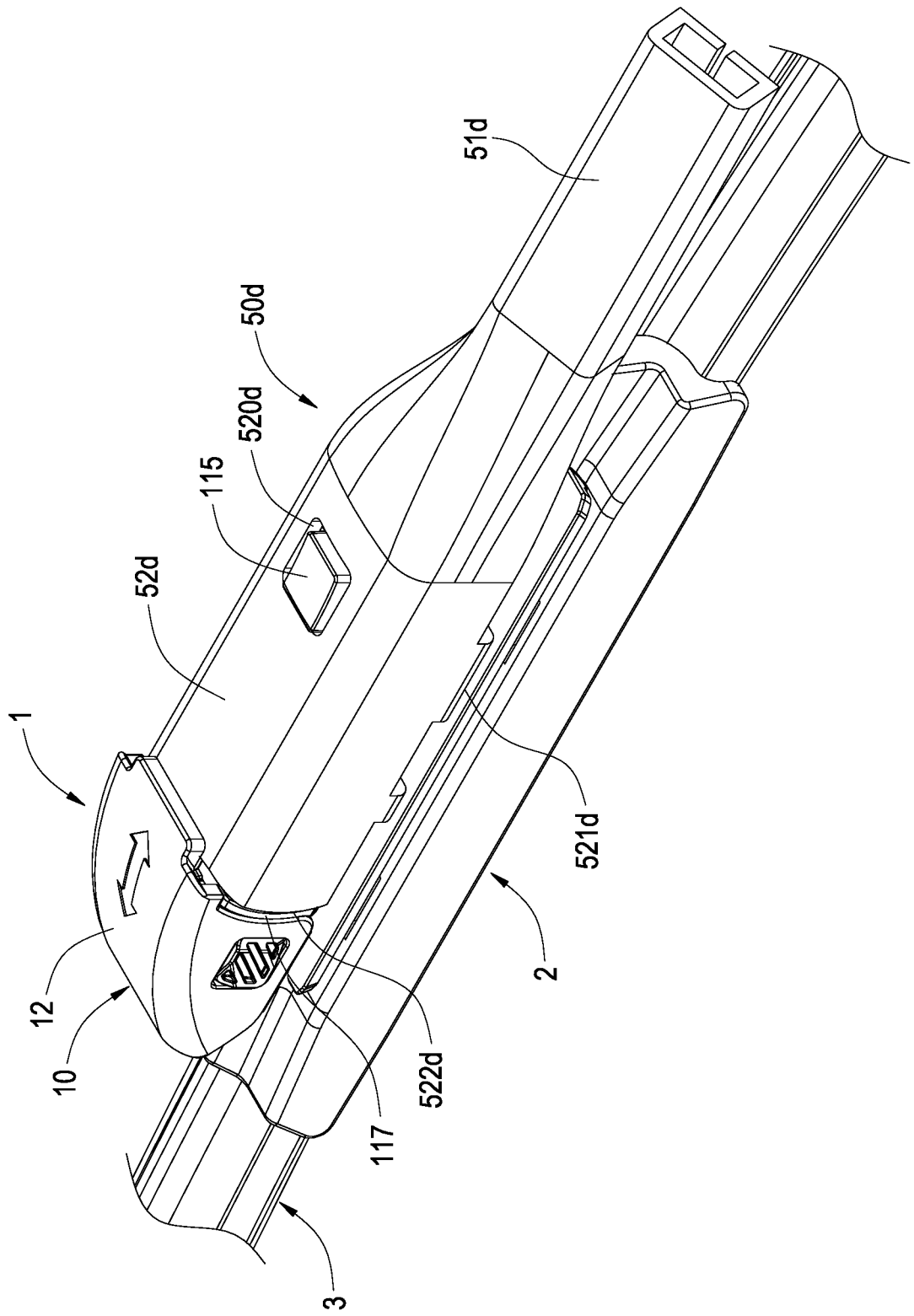
FIG. 17 and FIG. 18 are perspective appearance views from two side directions, showing that the universal wiper base assembly structure of the present disclosure is coupled to the fifth wiper driving arm.
Figure 18:
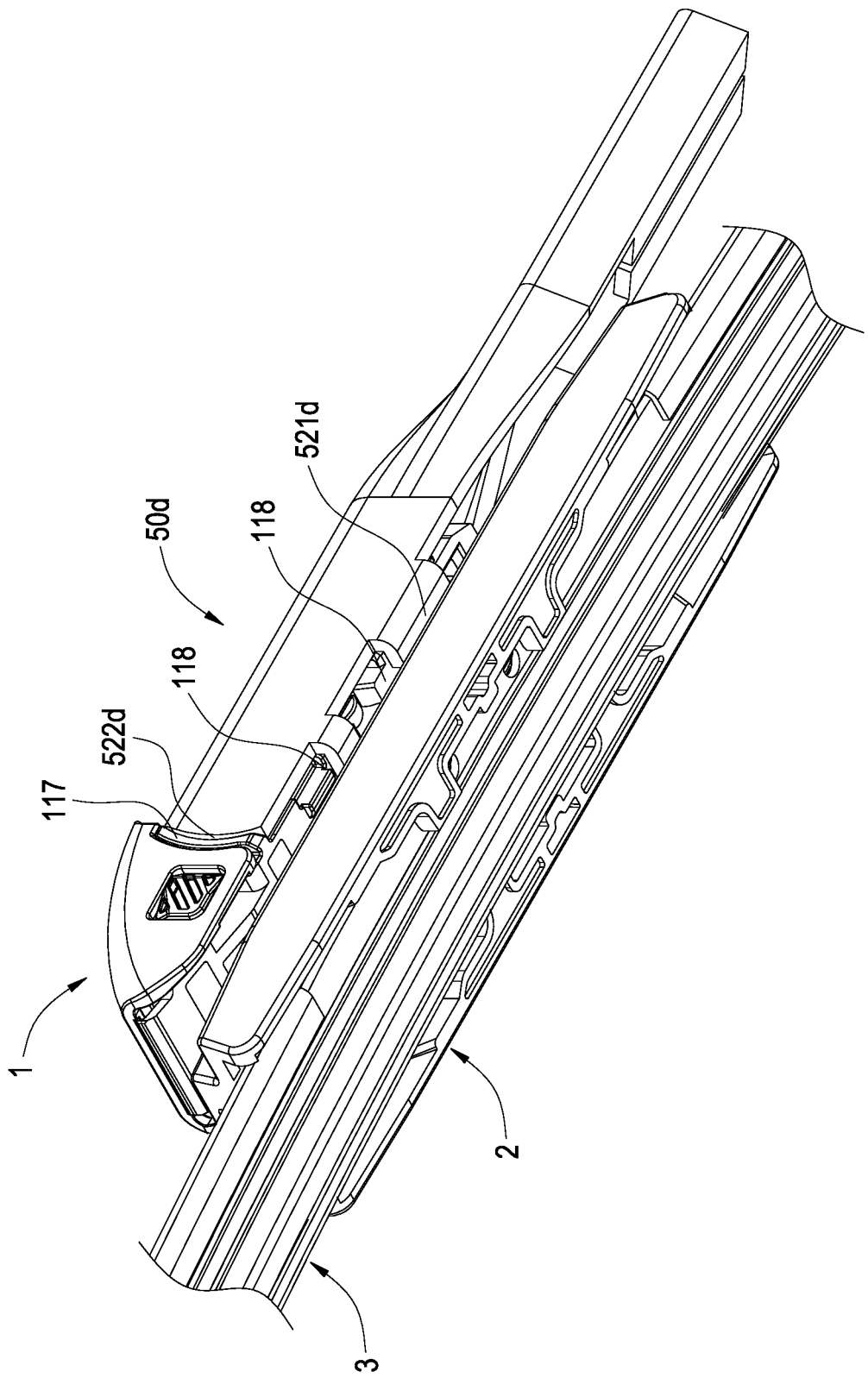

Please refer to FIG. 16 to FIG. 18. FIG. 16 is a schematic assembling view showing that the universal wiper base assembly structure of the present disclosure is coupled to a fifth wiper driving arm. FIG. 17 and FIG. 18 are perspective appearance views from two side directions, showing that the universal wiper base assembly structure of the present disclosure is coupled to the fifth wiper driving arm. In the present embodiment, only the fastening base 10 is reserved in the universal wiper base assembly structure 1. That is to say, the outer cover 40, the combination base 30, and the rear base 20 are removed. Moreover, the fastening base 10 includes two limiting arc surfaces 117 and a plurality of engagement grooves 118 on a bottom surface. In addition, the fifth wiper driving arm 50d includes a fifth arm body 51d and a shielding cover 52d connected to the fifth arm body 51d. The fifth arm body 51d is a U-shaped cover. A top of the cover 52d is provided with a fastening hole 520d, a bottom of the shielding cover 52d is provided with a plurality of hooks 521d, and a front end of the shielding cover 52d is provided with a plurality of positioning end surfaces 522d.

In actual assembling, the shielding cover 52d covers the fastening base 10. The positioning protrusion 115 passes through the fastening hole 520d. The hooks 521d on the bottom of the shielding cover 52d are engaged with the engagement grooves 118 on the bottom of the fastening base 10, and the decorative cover 12 of the fastening base 10 presses the shielding cover 52d. Accordingly, the fifth wiper driving arm 50d is coupled to the universal wiper base assembly structure 1 to drive the wiper blade 3 to move.

The above descriptions are only preferable embodiments of the present disclosure, and are not intended to limit the protection scope of the present disclosure. Equivalent changes based the spirit of the present disclosure should be deemed to fall within the protection scope of the present disclosure.

What is claimed is:

1. A universal wiper base assembly structure accommodating a wiper driving arm, the universal wiper base assembly structure comprising:

a fastening base, comprising a main body and a decorative cover, wherein the main body comprises a coupling hole defined at a bottom thereof, an insertion slot defined at a top thereof, a protruding platform, a positioning protrusion disposed on the protruding platform, a first shaft hole defined at a lateral side thereof, two limiting arc surfaces disposed on two sides thereof opposite to each other, and a plurality of engagement grooves defined on a bottom surface thereof, and the decorative cover is rotatably connected to a front side of the main body and comprises a fastening slot;

a rear base, comprising two contact blocks disposed on two sides thereof opposite to each other, a top abutting block abutting against the positioning protrusion, a trench defined in front of the top abutting block, and two hooks disposed in front of the top abutting block, wherein the rear base is detachably coupled to a rear side of the main body through the two hooks being engaged with the main body;
- a combination base, detachably coupled to a top surface of the main body and positioned in the trench, and comprising two side plates, a connection plate located between the two side plates, and an open groove defined at a position corresponding to the protruding platform and the positioning protrusion, wherein each of the side plates comprises a second shaft hole defined at a position corresponding to the first shaft hole; and
- an outer cover, comprising a fastening block, an opening exposing the protruding platform and the positioning protrusion, and a third shaft hole defined at a position corresponding the second shaft hole, wherein the outer cover is detachably fixed to the combination base by the fastening block being engaged with the fastening slot,
- wherein the wiper driving arm is positioned through the rear base, the combination base, or/and the outer cover being selectively coupled to the fastening base.

2. The universal wiper base assembly structure according to claim 1, wherein the main body comprises an engagement plate disposed in front of each of the limiting arc surfaces, the decorative cover comprises two wing plates, each of the wing plates comprises an engagement slot, and the decorative cover is positioned on the main body through the engagement slot being engaged with the engagement plate.

3. The universal wiper base assembly structure according to claim 2, wherein each of the wing plates comprises a positioning arc surface, and each of the limiting arc surfaces abuts against the positioning arc surface of each of the wing plates.

4. The universal wiper base assembly structure according to claim 1, wherein the main body comprises two insertion grooves disposed on a rear side of the positioning protrusion, the rear base comprises two insertion plates disposed on one side of the trench, and the two insertion plates are inserted in the two insertion grooves.

5. The universal wiper base assembly structure to claim 4, wherein the rear base comprises two abutting surfaces located in front of the two abutting blocks, and an insertion recess contacting a side wall of the main body is defined between each of the abutting surfaces and each of the insertion plates.

6. The universal wiper base assembly structure according to claim 1, wherein the main body comprises two blocking plates disposed on two sides of the protruding platform, and an end surface of the rear base abuts against the two blocking plates.

7. The universal wiper base assembly structure according to claim 1, wherein the combination base comprises a plurality of protruding ribs disposed on inner sides of the two side plates, and the protruding ribs are positioned in the engagement grooves of the main body.

8. The universal wiper base assembly structure according to claim 1, wherein the outer cover comprises an abutting portion located on an edge of the opening, and a profile of the abutting portion is corresponding to a shape of the top abutting block.

9. The universal wiper base assembly structure according to claim 1, wherein the wiper driving arm comprises a shaft, and the shaft passes through the third shaft hole, and/or the second shaft hole, and/or the first shaft hole.

10. The universal wiper base assembly structure according to claim 1, wherein the wiper driving arm comprises a fastening hole, the positioning protrusion is inserted in the fastening hole, and the decorative cover is configured to press the wiper driving arm.

\* \* \* \* \*